April 7, 1942.   I. PODLIASKY ET AL   2,279,246
VISUAL DIRECTION-FINDING SYSTEM
Filed May 31, 1939   2 Sheets-Sheet 1
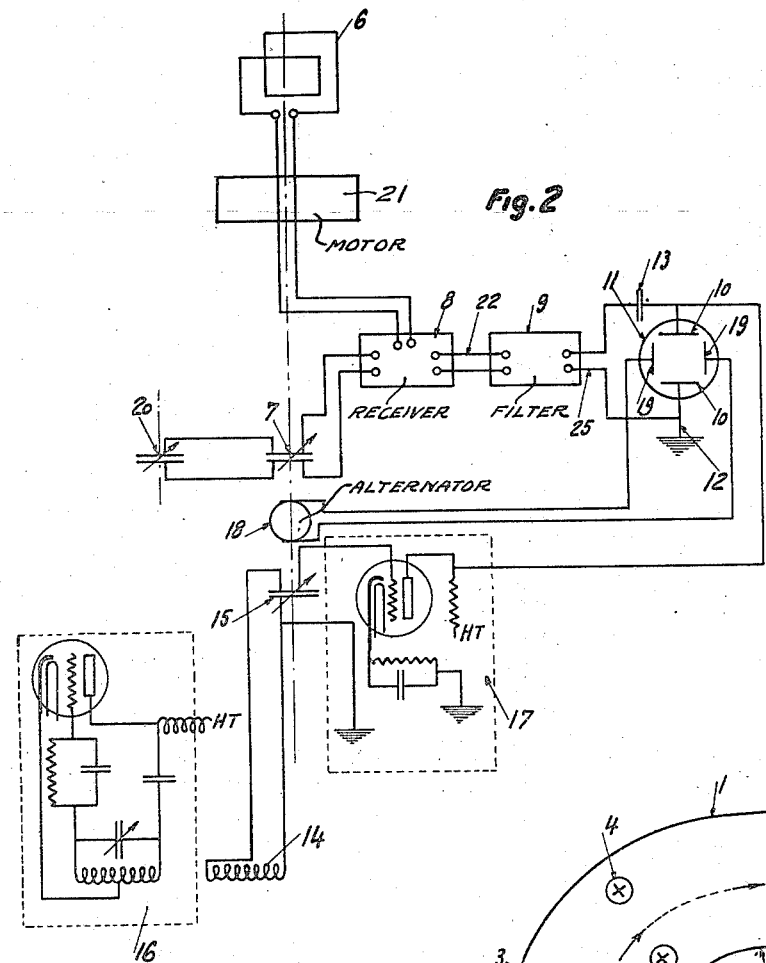
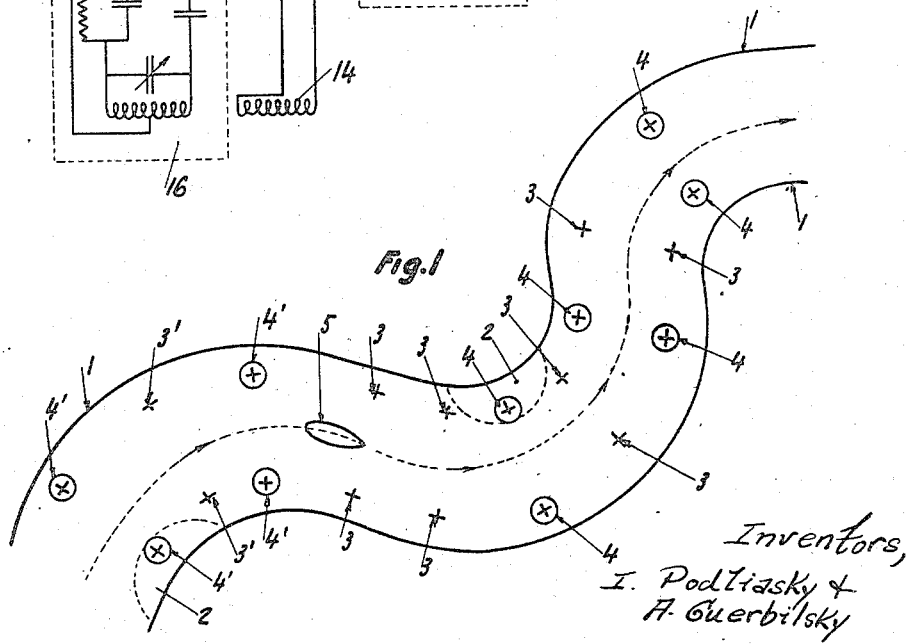
Inventors,
I. Podliasky &
A. Guerbilsky
by: Glascock Downing & Seebold
Attys.

April 7, 1942.  I. PODLIASKY ET AL  2,279,246
VISUAL DIRECTION-FINDING SYSTEM
Filed May 31, 1939  2 Sheets-Sheet 2
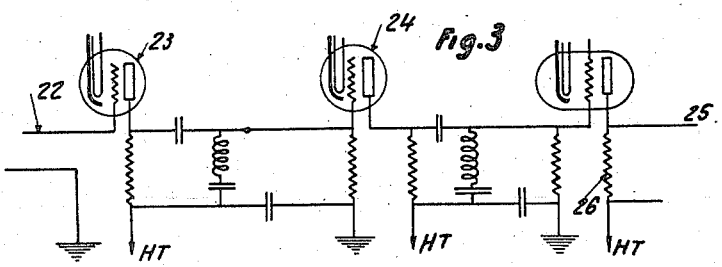
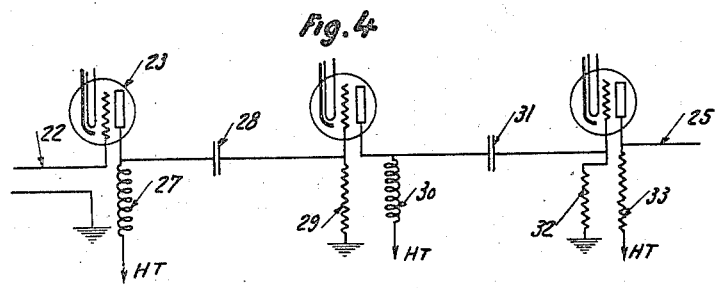
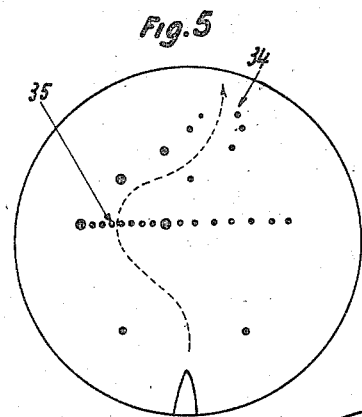
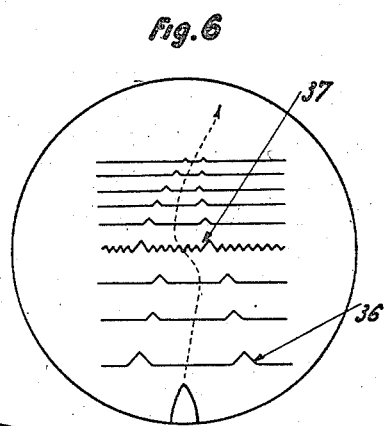
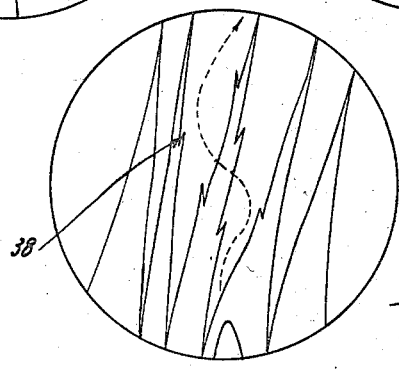
Inventors
I. Podliasky &
A. Guerbitsky
By: Glascock Downing & Seebold
Attys.

Patented Apr. 7, 1942

2,279,246

UNITED STATES PATENT OFFICE 2,279,246

VISUAL DIRECTION-FINDING SYSTEM

Ilia Podliasky, Asnieres, and Alexis Guerbilsky, Paris, France

Application May 31, 1939, Serial No. 276,692
In France June 3, 1938

3 Claims. (Cl. 250—11)

There are many methods for the guiding of ships in the fog, intended especially to facilitate their entering a harbor. The same problem applies to the landing of airplanes. These methods are generally based on indication being given to the pilot either with respect to any landmark or of the course he must follow at a given time. But it is clear that his task would be facilitated if he could constantly know, or even better, see, on the one hand his position, and, on the other hand, the course he is to follow, as he would see them with good visibility conditions. Now, in clear weather, pilots rely, especially at night, on the lights they can see.

The object of the present invention is to provide a visual device for representing the essential landmarks of the course to be followed (or of the landing field) even when visibility is bad.

According to an essential characteristic of the invention, this device includes, on the one hand, means carried by the beacons or the like for emitting, in addition to, or instead of, light beams, electromagnetic waves, and on the other hand, one or several receivers on the ship or aircraft for receiving these waves so as to indicate the direction of their source on a screen, thus enabling the pilot to see all of the beacons or the like on said screen. This representation corresponds to an incomplete or symbolic television since the pilot, instead of seeing the real objects, sees corresponding symbols with their respective positions and possibly with their respective distances.

The invention also applies to direction finding problems in general, permitting, in this case, to replace measurements by visual indications.

The working of the receiver may be divided into several parts which will now be described successively:

(a) For receiving emissions, use will be made of a rotating directive aerial, for instance a loop antenna. When use is made of a sense antenna, we may make use of any method for accentuating the curvature of the curve representing the current as a function of the angle of the loop when the position thereof corresponds to detection of a transmitter. On the contrary, when the apparatus does not include a sense antenna, there is, on the current curve, two minima of very sharp curvature which can be taken advantage of.

(b) In order visually to indicate the positions of the various transmitters, we preferably employ a cathode ray oscillograph, the signals being transmitted to this oscillograph when the loop antenna passes through each of the positions corresponding to the respective transmitters.

In order to transmit the impulses to the oscillograph without transmitting thereto the slow variations of the current in the loop antenna, we take advantage, according to the invention, of the accentuated curvature of the curve of this current. Now, this curvature corresponds either to the flow of high frequencies, or to a very high value of the second derivative and, eventually, of the derivatives of higher order. Therefore, use will be made of high-pass filters, or of devices the operation of which depends upon the second derivative or a derivative of higher order. Such devices may, for instance, be obtained by means of arrangements of the kind including reactance coils, with two or more cells, coupled together.

The impulses may act on the oscillograph either by producing sudden variations of the light spot, or by varying the intensity thereof, as is the case with television systems.

(c) The scanning of the oscillograph is determined on the one hand by the rotating loop antenna itself in such manner that the light spot scans the screen, for instance horizontally, at the same frequency as the rotation thereof.

Each line of transmitters is caused to work with a different frequency, each transmitter, or each line of transmitters perpendicular to the course to be followed having a different frequency which determines, by its value, the distance of the transmitter or the line of transmitters to the movable body. The second coordinate is therefore determined independently of the knowledge of the direction in which the direction finding device is turned.

This coordinate being determined by a frequency, a periodically variable tuning of the receiving will be established, for instance by means of a rotating condenser, the rotation of this condenser being synchronized with the second scanning of the oscillograph, for instance in the vertical direction. In this way, the reception of any transmitter is shown in the oscillograph only when the tuning frequency corresponds with this transmitter and, consequently, the position of the light spot in the vertical direction will have a coordinate corresponding to the distance from the transmitter.

The rotating condenser may be mechanically connected to the shaft of the rotating loop antenna with a suitable ratio of transmission. If the condenser is to turn at a speed considerably higher than that of the loop antenna, it may be useful, in order to reduce its speed of revolution, to give it a plurality of degrees of symmetry.

Sense discrimination will not be necessary since only the transmitters located for instance ahead of the ship range lie within the received band. When the movable body (ship) moves, we provide, according to the invention, the gradual modification of the basic frequency for the tuning of the transmitter, this basic frequency varying as the body itself moves. We call "basic frequency" the frequency of the receiving system when the above mentioned condenser occupies its initial angular position. These variations of frequency may be controlled either by the speed of the movable body, for instance, in the case of a ship, by the speed of revolution of the shaft through which the propeller is driven, or by the angle at which the transmitters appear. If, for instance, in the first line of transmitters there is one which is received under an angle (with reference to the fore-and-aft axis of the movable body) greater than a given value, the signal produces a sudden modification of the tuning frequency.

In this way, the image on the oscillograph moves as the movable body is running forward, the movement of the image being similar to that of the true image that would be seen by the pilot's eyes.

When it is difficult to admit a great number of distinct frequencies, the frequencies may be repeated after a certain number of transmitters or lines of emitters, but, in this case:

(A) The number of these lines should be sufficiently high in order that the signal which is repeated may be received with a low intensity as compared to that of the signal of a nearer transmitter to be received. We may employ, in addition, in this case, an automatic volume control which, in the case of the signal to be received being accompanied by signals of the same frequency which are to be eliminated, lowers the level of reception of the last mentioned signals so as to ensure amplitude discrimination.

(B) Furthermore, in order not to receive the signals coming from the space on the rear of the ship and of the same frequency as other signals coming from the front, we may arrange in such manner that the variable tuning of the receiver includes but a part of the distinct frequencies, whereby the signals emitted by stations located at the rear with the same frequency as those to be received from the front always come from transmitters located at a rather considerable distance. For this purpose, this fraction of the total number of frequencies within the tuning range must be lower than one half of the total number.

Other features of the present invention will result from the following detailed description of some specific embodiments thereof.

Preferred embodiments of the present invention will be hereinafter described, with reference to the accompanying drawings, given merely by way of example, and in which:

Fig. 1 diagrammatically shows a river or channel provided with a system of transmitters according to the invention;

Fig. 2 diagrammatically shows a receiver according to the invention;

Fig. 3 shows a high-pass filter to be used in connection with the invention;

Fig. 4 is a diagrammatical view of a reaction amplification cell or stage;

Fig. 5 shows the appearance of the screen when the intensity of the light spot is modulated;

Fig. 6 shows the appearance of the screen of the oscillograph when the signal produces the sudden deviation of the light spot and when the horizontal scanning is fast with respect to the vertical scanning;

Fig. 7 shows the appearance of the oscillograph screen when the detection of the direction of one of the transmitters corresponds to a sudden deviation of the light spot and when the vertical scanning is fast with respect to the horizontal scanning.

In Fig. 1, we have shown at 1 a river the shallow portions of which are shown at 2. Reference numerals 3 designate ordinary transmitters located either on the banks of the river or on buoys and which emit signals intended to be received on a ship 5. We have shown at 4 the modulated transmitters which give, in addition to the transmission intended to determine the position of the transmitter, the indication of a danger, and, eventually, of the nature of the danger. The stations located at the rear of the ship and the signals of which are not received by the visual indicator apparatus, are indicated at 3' and 4'.

In Fig. 2, which shows a receiving station located on board a movable body such, for instance, as the ship above mentioned, and shown at 5 in Fig. 1, reference numeral 6 designates a rotating loop antenna tuned by means of a rotating condenser 7 and acting on a receiver 8.

As receiver 8, we may make use, for instance, of any radio-electric receiver, such for instance as a super-heterodyne receiver, the essential condition being that it includes means for detecting high frequency currents.

The output end of receiver 8 is connected to the filtering cell 9, intended to detect the peaks or deeps of the low frequency current supplied by receiver 8. The output end of this cell is connected to the plates 10 of oscillograph 11.

One of these plates is earthed as shown at 12 and connected at 25 with the cell 9. The other is connected to cell 9 through a condenser 13. Condenser 13 transmits the impulses of short duration to the oscillograph. The vertical scanning is determined by a device which acts on the same plate 10. This device may be constituted, for instance, by a high frequency generator 16, acting by induction on a circuit 14, tuned through a second rotating condenser 15, synchronized with condenser 7. The current of this circuit is detected by a detector 17 and the voltage at the output end of this detector is utilized for the vertical scanning. The slope of the resonance curve of circuit 16 is utilized to produce the voltage variation which ensures the vertical scanning necessary to produce the perspective effect.

The horizontal scanning is effected by means of any suitable device which may be of the same nature as that employed for the vertical scanning. It is synchronized with the rotation of loop antenna 6. On the drawing, we have shown this device at 18 in the form of an alternator keyed on the same shaft as loop antenna 6. The voltage supplied by the alternator acts on the plates 19 of the oscillograph.

The variation of the basic frequency (that is to say of the tuning frequency of the receiver system when condenser 7 is in the initial angular position) as a function of the forward motion of the movable body is obtained by means of variable condenser 20, controlled for instance by the rotation of the propeller of the ship (not shown). For practical purposes, this synchronization between condenser 20 and the propeller must not necessarily be obtained by means of a mechanical connection. As a matter of fact, there generally exist on ships, electrical transmissions for the driving of the revolution counters. Such an electric transmission can easily be utilized for driving condenser 20.

This device works in the following manner:

When the loop antenna 6, driven by motor 21, performs a full revolution about its vertical axis, alternator 18, which is also driven by said motor 21, in synchronism with antenna 6, produces a horizontal scanning line on the screen of oscillograph 11, the displacement of the light spot on said scanning line being substantially proportional to the rotation of antenna 6. If, during this rotation, the loop antenna passes through a position corresponding to a transmitter on which it is tuned, the receiver 8—9 produces on the horizontal scanning line, a mark which represents said transmitter. But all the transmitters having other wave-lengths are without influence on the light spot of the oscillograph.

After a short time, condenser 7, which is also driven by motor 21, but at a speed substantially lower than that of the antenna, modifies the tuning of the receiver so that the latter is now tuned to the next line or row of transmitters.

Simultaneously, condenser 15, which is driven in synchronism with condenser 7, produces a vertical displacement of the horizontal scanning line in the oscillograph. This is due to the fact that a vertical scanning is produced by a variation of voltage between plates 10 determined by the current in the detector tube of device 17. This current results from the voltage induced in coil 14 by oscillator 16, as a consequence of the variation of capacity of condenser 15.

The new horizontal scanning line produced in the oscillograph corresponds in position to the second row of transmitters that is being transmitted. It shows marks indicating the position of said transmitters on said row, in the manner above described.

Thus, there will be produced, on the screen of the transmitter, successively, a series of horizontal scanning lines on each of which is marked the position of the transmitters of the successive rows or lines to which said scanning lines correspond. But, as all these operations are performed in a very short time, such that all the marks corresponding to the whole series of lines are seen simultaneously on the screen, the pilot practically sees a representation of all the beacons carrying the transmitters.

Due to the fact that there is an interval between two successive horizontal scanning lines and the angular spacings between the beacons of a row or line are preserved, a certain perspective effect is obtained. If the intervals between the horizontal scanning lines decrease gradually in accordance with the distance of the corresponding rows or lines of beacons from the ship, a true perspective effect is obtained.

It will be readily understood that, whenever the ship moves past a line or row of transmitters (beacons), the initial tuning of the receiver must no longer be that corresponding to the wavelength of said row of transmitters but that corresponding to the wave-length of the next row of transmitters. For this purpose, the trimmer condenser 20, cooperating with condenser 7, is varied in accordance with the displacement of the ship.

In Fig. 3, we have shown, by way of example, a cell of a high-pass filter of a known type which will be but shortly described, in view of the fact that it is widely used in the art. In this figure, the amplifier 8 of Fig. 2 acts on the input grid. The filter cell is located between the anode 23 of the first tube and the grid 24 of the second tube. The anode of this second tube is connected to the grid of the next tube through a cell of the same kind. Finally, the output end which corresponds to the wire 25 of Fig. 2 acts upon the plate 10 of the oscillograph and the anode of the last tube is connected to the high tension through a resistance 26. The cathodes are earthed and the filaments are heated in the usual manner.

In Fig. 4, we have shown a cell with reactance coil which is responsive to variations of the second derivative of the current. The anode 23 of the first tube is connected to the high tension through a reactance coil 27 and to the grid of the next tube through a condenser 28. The grid of this second tube is connected to the earth through a resistance 29. The anode of the next tube is connected to the high tension through a reactance coil 30 and to the grid of the next tube through a condenser 31. This last mentioned grid is earthed, with the interposition of a resistance 32. The anode of this tube is connected to the high tension through a resistance 33. This resistance 33 is connected to the wire 25 leading to the oscillograph.

In Fig. 5, we have shown the screen of oscillograph 10. When the signals from the transmitters which indicate the course to be followed are received, the points 34 represent on the screen in question the position of these transmitters, in a modification in which the wires 25 of Fig. 2, instead of being connected to plates 11, are connected to a supplementary electrode belonging to the electronic optic system of the oscillograph and acting by variation of the luminous intensity of the light spot in a manner well known in television. The dangerous passages corresponding to the transmitters 4 of Fig. 1 correspond to dotted lines such as 35.

In the embodiment illustrated by Fig. 6, the oscillograph is mounted according to the arrangement of Fig. 2. The speed of revolution of the condenser is slow with respect to the speed of revolution of antenna 6. The positions of the transmitters correspond to points 36 and the dangerous passages are indicated by small zig-zag portions such as shown at 37.

In the embodiment illustrated by Fig. 7, the same screen assumes a slightly different appearance due to the fact that the speed of revolution of condenser 7 is high as compared with the speed of revolution of antenna 6. In this case, the vertical lines are more numerous than the horizontal lines. The positions of the respective transmitters correspond to the small zig-zag 38.

In order to increase the luminosity of the image, and also to reduce the speed of revolution of the rotating antenna, we may make use of an oscillograph having a fluorescent screen with a great luminous persistency.

Our invention also includes a method for giving the pilot of the movable body (ship or aircraft), in addition to a visual representation of the course along which he is to proceed, an image in relief which is more capable of giving him the feeling of the direct vision to which he is accustomed. For this purpose, according to the present invention, it suffices to provide two distinct directional aerials located symmetrically on either side of the fore-and-aft axis of the ship, the oscillographs of the two corresponding receivers being located side by side. The apparatus is completed by two stereoscope lenses.

In the embodiment illustrated by Fig. 2, the variable tuning means such as 20 may be controlled through a device adapted to modify the adjustment of said means every time the movable body (ship for instance) moves past a beacon or group of beacons so as to produce a new adjustment corresponding to the position of said body (the beacon or group of beacons that have been left behind now becoming useless).

In a general manner, while we have, in the above description, disclosed what we deem to be practical and efficient embodiments of the present invention, it should be well understood that we do not wish to be limited thereto as there might be changes made in the arrangement, disposition, and form of the parts without departing from the principle of the present invention as comprehended within the scope of the appended claims.

What we claim is:

1. An apparatus for guiding a movable body, and especially an airplane or a ship, which comprises, in combination, a plurality of stationary radio transmitters arranged by rows of at least two, said rows being placed one behind another and corresponding each to a different wavelength of transmission, respectively, and a radio receiver carried by said movable body including a directive antenna, means for rotating said antenna about a vertical axis, a screen, means, operative by the means which rotates the antenna and in synchronism with such rotation, for scanning said screen by means of a visible spot moved parallelly to a given direction, in synchronism with the movement of said antenna, means, responsive to radio signals received by said antenna, for marking on the path of said spot the points corresponding to the antenna being directed toward a stationary radio transmitter, means for successively tuning said receiver to the respective rows of transmitters, and means, adapted to work in synchronism with said tuning means, for successively displacing the path of said scanning spot on said screen, in a direction transverse to the above mentioned scanning direction as the tuning varies, respectively.

2. An apparatus according to claim 1 further including means for varying the initial tuning of said receiver in accordance with the displacement of said movable body.

3. An apparatus according to claim 1 in which the means for marking the points on the path of said spot are responsive to variations of the second derivative, with respect to time, of the current in said receiver.

ILIA PODLIASKY.
ALEXIS GUERBILSKY.